United States Patent
Knueven et al.

(10) Patent No.: US 7,237,233 B2
(45) Date of Patent: Jun. 26, 2007

(54) ASSEMBLY DIRECTIVES FOR THE SUPPORT OF MULTI-LANGUAGE PROGRAMMING

(75) Inventors: Paul Knueven, Pittsburgh, PA (US); Christopher M. Wolf, Missouri City, TX (US)

(73) Assignee: Texas Instruments Incorporated, Dallas, TX (US)

( * ) Notice: Subject to any disclaimer, the term of this patent is extended or adjusted under 35 U.S.C. 154(b) by 760 days.

(21) Appl. No.: 10/324,652

(22) Filed: Dec. 19, 2002

(65) Prior Publication Data

US 2004/0123276 A1    Jun. 24, 2004

(51) Int. Cl.
G06F 9/44 (2006.01)
(52) U.S. Cl. .................. 717/140; 717/114; 717/137
(58) Field of Classification Search ................. 717/114
See application file for complete search history.

(56) References Cited

U.S. PATENT DOCUMENTS

| | | | | |
|---|---|---|---|---|
| 4,667,290 A * | 5/1987 | Goss et al. | ................. | 717/147 |
| 5,805,893 A * | 9/1998 | Sproul et al. | ............... | 717/137 |
| 5,884,314 A * | 3/1999 | Bulusu | ....................... | 707/100 |
| 5,946,489 A * | 8/1999 | Yellin et al. | ................. | 717/147 |
| 6,021,275 A * | 2/2000 | Horwat | ........................ | 717/159 |
| 6,066,181 A * | 5/2000 | DeMaster | .................... | 717/148 |
| 6,314,557 B1 * | 11/2001 | Shenderovich | .............. | 717/114 |
| 6,550,058 B1 * | 4/2003 | Wynn | .......................... | 717/158 |
| 6,968,548 B1 * | 11/2005 | Tabbert | ....................... | 717/162 |
| 2003/0005418 A1 * | 1/2003 | Sridhar et al. | .............. | 717/140 |

OTHER PUBLICATIONS

TMS320C55x Assembly Language Tools User's Guide: *Assembler Directives, Chapter 4*, pp. 4-1 to 4-104.

* cited by examiner

*Primary Examiner*—Tuan Dam
*Assistant Examiner*—Andrew Y. Chou
(74) *Attorney, Agent, or Firm*—Robert D. Marshall, Jr.; W. James Brady; Frederick J. Telecky, Jr.

(57) ABSTRACT

The present invention provides methods for facilitating the sharing of data structures in a software application written using both a high level programming language and assembly language. Methods are provided for defining a data structure in an assembly language program such that the data structure is created in exact conformance to the physical and logical memory layout mandated for a comparable data structure by a compiler for a high level language. Such methods comprise providing assembly language directives that cause the assembler to automatically adapt a data structure definition to the alignment constraints imposed by the high level language compiler.

14 Claims, 2 Drawing Sheets

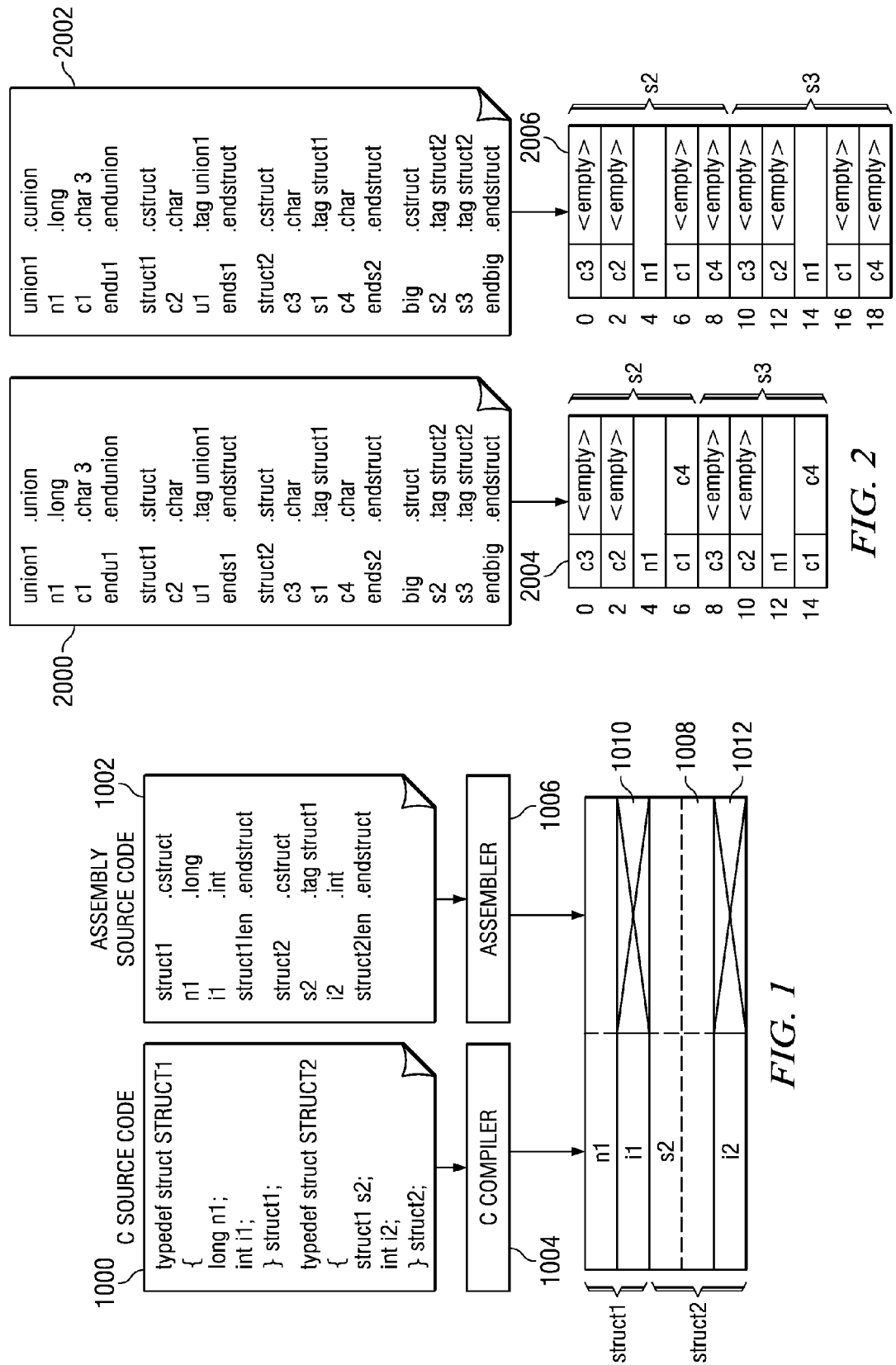

ASSEMBLY DIRECTIVES FOR THE SUPPORT OF MULTI-LANGUAGE PROGRAMMING

FIELD OF THE INVENTION

This invention generally relates to embedded software applications, and more specifically to embedded software applications combining source code written in a high level language with source code written in assembly language.

BACKGROUND OF THE INVENTION

Embedded applications are typically developed using a composition of high-level language, e.g., the C programming language, and low-level assembly language. The high level language provides abstraction and portability and is best suited to represent target independent modules of the application. Assembly language is used to develop low level, target dependent functionality, e.g., device drivers, and where optimal processor performance is desired. In such applications, it is common and desirable for the modules written in the high level language and the assembly language modules to share data structures.

The shared data structures may be allocated and optionally initialized by either the high-level language compiler in response to specifications in the high-level language source code or by the assembler in response to specifications in the assembly language source code. In the latter case, the data structures must be created to conform to compiler conventions for alignment of such structures in memory and the memory length of primitive data types. These compiler conventions are based on the memory models supported by the target hardware. For example, the TMS320C55 C compiler available from Texas Instruments Incorporated supports both a small and a large memory model, wherein the length of a data pointer is 16 bits in the small memory model and 23 bits in the large memory model.

Finally, the architecture of the target hardware of the application may impose memory alignment requirements. For example, the architecture may require that all code pointers be located at even word addresses, regardless of the actual length of the pointer. And, the architecture may provide support for both 16-bit data addresses and 23-bit data addresses where a 16-bit data address may be located at either an even or odd word address while a 23-bit data address must be located at an even word address.

Therefore, there are a variety of combinations or sets of memory alignment constraints attributable to differing memory models, compiler alignment constraints, and hardware alignment constraints that may be imposed on a data structure used by both high level language and assembly code. Current approaches to handling these combinatorial factors have significant development and maintenance costs when an embedded application is targeted for multiple architectures with differing memory models. Multiple possible sets of memory alignment constraints are possible in this situation. While the high level language modules can simply be recompiled with a compiler targeted to the desired memory model and hardware architecture, the shared data structures in the assemble language modules must be modified for each new set of memory alignment constraints introduced.

These modifications to support the new architectures will likely involve a significant re-write of the shared data structures. The programmer has to re-analyze the structures in view of the new memory alignment requirements and determine the appropriate alignment and offset of each element. Any changes to the data structures must be made manually by the programmer, creating a potential for the introduction of errors. Also, multiple versions of the data structures are created, posing future maintenance issues.

SUMMARY OF THE INVENTION

The present invention provides methods for facilitating the sharing of data structures in a software application written using both a high level programming language and assembly language. Methods are provided for defining a data structure in an assembly language program such that the data structure is created in exact conformance to the physical and logical memory layout mandated for a comparable data structure by a compiler for a high level language. Such methods comprise providing assembly language directives that cause the assembler to automatically adapt a data structure definition to the alignment constraints imposed by the high level language compiler.

BRIEF DESCRIPTION OF THE DRAWINGS

Particular embodiments in accordance with the invention will now be described, by way of example only, and with reference to the accompanying drawings in which:

FIG. 1 illustrates a method for defining a data structure in assembly language that may shared with a program written in a high level language such that the layout of the data structure when assembled is identical to that of a comparable data structure defined in the high level language and compiled;

FIG. 2 illustrates an embodiment of a method of the invention; and

Corresponding numerals and symbols in the different figures and tables refer to corresponding parts unless otherwise indicated.

DETAILED DESCRIPTION OF EMBODIMENTS OF THE INVENTION

Figure 3:
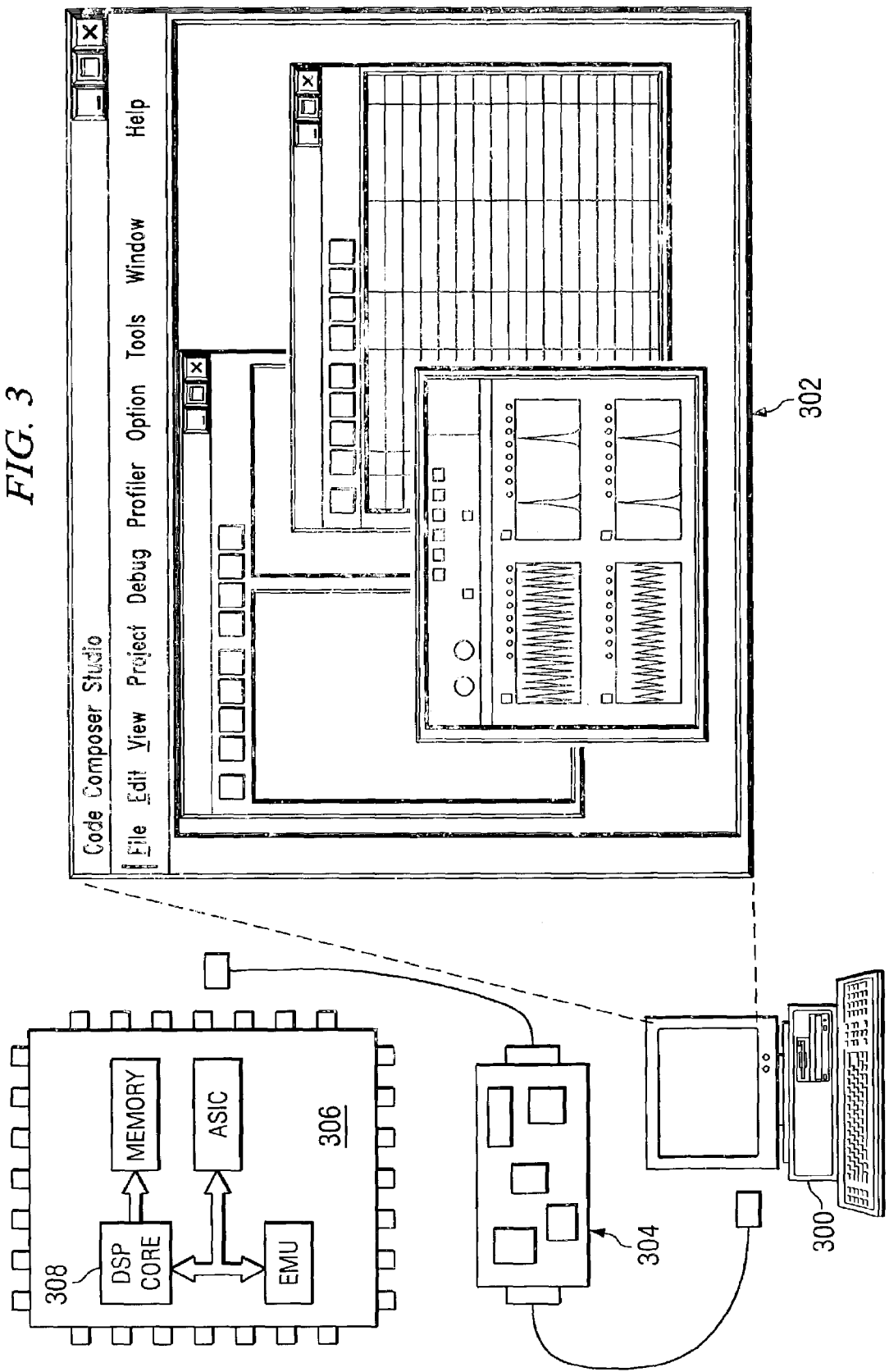
FIG. 3 illustrates the elements of a development system including an assembler that incorporates the method of FIG. 1.

Methods for defining shared data structures in assembly language such that they are automatically adapted to differing memory models, compiler alignment constraints, and hardware alignment constraints when the assembly language source code is assembled have now been developed by the present inventors. These methods are described below assuming that the high level language used is C and that the target memory models are a small model with a 16-bit address space for data and a 24 bit address space for code and a large model with a 23-bit address space for data and a 24 bit address space for code. The architecture of the target processor requires that all code pointers and all data pointers larger than 16 bits be located on even word boundaries in memory. 16-bit data pointers may be located on even or odd word boundaries in memory. Adaptation of these methods to other high level languages, such as C++ or Java, other memory models, and/or other processor architectures will be obvious to one with ordinary skill in the art with reference to the following descriptions.

The examples provided in the tables and figures assume that the target processor is a Texas Instruments Incorporated TMS320C55x with a corresponding assembler and C compiler. The assembly language for this processor's assembler is documented in the "TMS320C55x Assembly Language Tools User's Guide" available at http://www-s.ti.com/sc/psheets/spru280d/spru280d.pdf. The assembler directives used in the examples, other than those provided by the current invention, are defined in Chapter 4. The operation of such directives is well known in the art and should be apparent to one skilled in the art. The C compiler for this processor is documented in the "TMS320C55x Optimizing C/C++ Compiler Users Guide" available at http://www-s.ti.com/sc/psheets/spru281c/spru281c.pdf.

FIG. 1 illustrates a method for defining a data structure in assembly language that may shared with a program written in a high level language such that the layout of the data structure when assembled is identical to that of a comparable data structure defined in the high level language and compiled. In an embodiment, a new assembler directive, .cstruct, is provided as an extension to the assembly language for the target processor. Using this directive in assembly language source code to define a data structure will cause that data structure to be created such that its layout in memory conforms to any alignment constraints imposed by the C compiler and the architecture of the target processor.

The TMS320C55x C compiler requires that any data structure comprised of elements having alignment constraints must begin at an even memory address and be of even length. An element in a data structure has a memory alignment constraint if it must be placed at an even address or offset in memory but its relative location in the data structure would cause it to be placed at an odd address or offset due to the placement and length of previous elements. The TMS320C55x architecture mandates that 32 bit data be placed at an even address. In the small memory model, a code pointer is 32-bits and thus has an alignment constraint requiring it to be placed at an even address within a data structure while a data pointer is limited to 16-bits and has no alignment constraint. In the large memory model, both code pointers and data pointers have alignment constraints and must be placed at even addresses within a data structure. Any other data elements greater than 16-bits in length will also have alignment constraints in either memory model. Furthermore, if an element of a data structure is another data structure, generically referred to as a substructure, that substructure may also have an alignment constraint due to its element composition.

C source code 1000 defines two simple data structures, STRUCT1 and STRUCT2. STRUCT1 has two elements, a 32-bit word n1 and an integer i1. STRUCT2 is defined with two elements as well, the first element being a substructure s1 of type STRUCT1 and the second being an integer i2. When C source code 1000 is compiled by C compiler 1004, structure template 1008 results. STRUCT1 occupies four bytes of the template with the fourth byte 1010 being empty due to an integer being sixteen bits in length and the alignment constraints imposed on STRUCT2. STRUCT2 occupies three words of the template, with the final byte again being empty due to integer length and the alignment constraint that a structure must be of even size. Any data structure of type STRUCT2 will have a memory layout corresponding to structure template 1008.

Assembly source code 1002 defines the same two simple data structures using various assembly language directives that allocate space for 32-bit values (.long), integers (.int), and substructures (.tag) to define the elements. In an embodiment, a new assembly language directive, .cstruct, as illustrated in assembly source code 1002, is provided to enable the definition of structures in assembly language that have the same memory layout as a corresponding structure defined in C.

In prior art, the only directive available for defining a structure was .struct. The .struct directive assigns symbolic offsets to the elements of a data structure definition so that the assembler can calculate the offset of each element. The elements of a structure declared with struct are tightly packed. That is, no gaps are left in the structure. If the length of an element is such that it ends on an odd word boundary, the next element in the structure will begin at that boundary. If a programmer wanted to define a structure to be shared with C, he had to be aware of the alignment constraints imposed by the compiler and specifically insert gaps in a data structure to conform to those constraints. The .cstruct directive also assigns symbolic offsets to the elements of a data structure definition but it assigns those offsets so that appropriate gaps are left in the structure layout if there are alignment constraints on the elements. The programmer no longer has to be aware of those alignment constraints and compensate for them in the data structure definition.

Therefore, because the data structures struct1 and struct2 in assembly source code 1002 are defined using the .cstruct directive, when the source code is assembled with assembler 1006, structure template 1008 results. It is the same structure template that was produced by compiling C source code 1000 and any data structure of type struct2 will have a memory layout corresponding to the template.

FIG. 2 illustrates an embodiment in which a second assembler directive is provided for creating data structures compatible with a high level language. In this embodiment, the directive .cunion is introduced. Its operation is similar to that of a union in the C programming language. It may be used alone or in conjunction with the .cstruct directive. This directive has a similar operation to the prior art .union directive in that it is used to assign symbolic offsets to the elements of alternate data structure definitions to be allocated in the same memory space. However, .union assumes that a tightly packed data structure in which gaps are not generally left between elements is to be created while .cunion permits the creation of a data structure in which the elements are automatically aligned to conform to the alignment constraints imposed by the C compiler on elements of the same type.

In FIG. 2, assembly source code defining a data structure named big is presented. The only difference between assembly source code 2000 and assembly source code 2002 is the use of .struct and .union in assembly source code 2000 and .cstruct and .cunion in assembly source code 2002. The data structure big is comprised of two substructures s2 and s3 that are of type struct2. struct2 is comprised of three elements: c3 of type character, s1 of type struct1 and c4 of type character. It will create a structure template with a size of eight bytes as defined in assembly source code 2000 and of ten bytes as defined in assembly source code 2002. struct1 is comprised of two elements, c2 of type character and u1 of type union1. It will create a structure template with a size of five bytes as defined in assembly source code 2000 while as defined in assembly source code 2002, the structure template will have a size of six bytes. And, union1 is comprised of two elements, n1 of type long and c1 of type character. As defined in assembly source code 2000, union1 will create a structure template with a size of three bytes while as defined in assembly source code 2002, it will create a structure template with a size of four bytes. Thus, struct2 will create a structure template with a size of eight bytes as defined in assembly source code 2000 and with a size of ten bytes as defined in assembly source code 2002.

Structure template layout 2004 illustrates the tightly packed layout resulting from the use of .struct and .union to define the substructures of big and structure template 2006 illustrates the layout that results when .cstruct and .cunion are used to define the same substructures. In structure template 2004, c4 is allocated in the byte immediately following c1 (at offset 6 and offset 12) and the overall size of big is sixteen bytes. But, in structure template 2006, c4 is allocated at offset 8 and offset 18 and pads are inserted in the structure template at offset 7 and offset 17. This is because in the definition of struct2, c4 is preceded by s1, a substructure of type struct1. The C compiler requires that all substructures be of an even length, so any element following a substructure will always be allocated at an even offset in the parent structure. In addition, because the parent structure, big, must also be of even length, a pad is inserted in the structure template at offset 19. Because of these alignment constraints, the overall size of big in structure template 2006 is twenty bytes.

FIG. 3 illustrates the elements of a development system including an assembler that incorporates the method of FIG. 1. General purpose computer 300 is connected to target hardware 306 with emulation controller 304. Target hardware 306 is a digital system that includes processor 308. General purpose computer 300 hosts a software development system with user interface 302. This software development system includes in its functionality an assembler and a high level language compiler. The assembler provides the methods described herein to permit data structures to be defined in assembly language that are identical to comparable data structures defined in the high level language.

While the invention has been described with reference to illustrative embodiments, this description should not be construed in a limiting sense. Various other embodiments of the invention will be apparent to persons skilled in the art upon reference to this description. For example, adaptation to high-level languages other than C will be apparent to those skilled in the art. Also, other types of structures can be defined by corresponding directives in a manner similar to that described above. It is therefore contemplated that the appended claims will cover any such modifications of the embodiments as fall within the true scope and spirit of the invention.

What is claimed is:

1. A method for defining a data structure in an assembly language program comprising:
   providing one or more high-level language specific directives that direct an assembler for the assembly language program to create the data structure in exact conformance to the physical and logical memory layout mandated for a comparable data structure by a compiler for a high-level language, a first directive assigning a symbolic offset to each of a plurality of elements comprising the data structure, the symbolic offset of each element determined based on the memory alignment requirements for an element of the same type as mandated by the compiler; and
   assembling the assembly language program including said one or more high-level language specific directives by creating a data structure corresponding to said high-level language specific directive having a data structure in exact conformance to the physical and logical memory layout mandated for a comparable data structure by the compiler for the high-level language.

2. The method of claim 1 wherein each element of the data structure may be defined as a primitive data type or as a substructure.

3. The method of claim 1 wherein each element of the data structure may be defined as a primitive data type or as a substructure.

4. The method of claim 1 wherein each element of the data structure may be defined as a primitive data type or as a substructure.

5. The method of claim 1 wherein a size of the data structure is adjusted to match the size of the comparable data structure.

6. The method of claim 5 wherein each element of the data structure may be defined as a primitive data type or as a substructure.

7. A method for defining a data structure in an assembly language program comprising:
   providing one or more high-level language specific directives that direct an assembler for the assembly language program to create the data structure in exact conformance to the physical and logical memory layout mandated for a comparable data structure by a compiler for a high-level language, a first directive assigning a symbolic offset to each of alternate pluralities of elements of the data structure wherein each alternate plurality of elements is allocated to the same physical memory locations in a software application; and
   assembling the assembly language program including said one or more high-level language specific directives by creating a data structure corresponding to said high-level language specific directive having a data structure in exact conformance to the physical and logical memory layout mandated for a comparable data structure by the compiler for the high-level language.

8. The method of claim 7 wherein each element of the data structure may be defined as a primitive data type or as a substructure.

9. A method for defining a data structure in an assembly language program comprising:
   providing one or more high-level language specific directives that direct an assembler for the assembly language program to create the data structure in exact conformance to the physical and logical memory layout mandated for a comparable data structure by a compiler for a high-level language, a first directive assigning a symbolic offset to each of a plurality of elements comprising the data structure, a second directive assigns a symbolic offset to each of alternate pluralities of elements of the data structure wherein each alternate plurality of elements is allocated to the same physical memory locations in a software application; and
   assembling the assembly language program including said one or more high-level language specific directives by creating a data structure corresponding to said high-level language specific directive having a data structure in exact conformance to the physical and logical memory layout mandated for a comparable data structure by the compiler for the high-level language.

10. The method of claim 9 wherein each element of the data structure may be defined as a primitive data type or as a substructure.

11. The method of claim 9 wherein the symbolic offset of each element is determined based on the memory alignment requirements for an element of the same type as mandated by the compiler.

12. The method of claim 11 wherein each element of the data structure may be defined as a primitive data type or as a substructure.

13. The method of claim 11 wherein a size of the data structure is adjusted to match the size of the comparable data structure.

14. The method of claim 13 wherein each element of the data structure may be defined as a primitive data type or as a substructure.

* * * * *